(12) United States Patent
Noble et al.

(10) Patent No.: US 11,336,163 B2
(45) Date of Patent: May 17, 2022

(54) LOW PROFILE AXIAL, FLUX PERMANENT MAGNET SYNCHRONOUS MOTOR

(71) Applicant: DELTA T, LLC, Lexington, KY (US)

(72) Inventors: Ernest John Noble, Selangor (MY); Ken Siong Tan, Selangor (MY)

(73) Assignee: DELTA T, LLC, Lexington, KY (US)

( * ) Notice: Subject to any disclaimer, the term of this patent is extended or adjusted under 35 U.S.C. 154(b) by 139 days.

(21) Appl. No.: 15/753,065

(22) PCT Filed: Aug. 17, 2016

(86) PCT No.: PCT/US2016/047297
§ 371 (c)(1),
(2) Date: Feb. 15, 2018

(87) PCT Pub. No.: WO2017/031178
PCT Pub. Date: Feb. 23, 2017

(65) Prior Publication Data
US 2019/0006925 A1 Jan. 3, 2019

Related U.S. Application Data

(60) Provisional application No. 62/205,987, filed on Aug. 17, 2015.

(51) Int. Cl.
*H02K 21/24* (2006.01)
*H02K 1/2793* (2022.01)
(Continued)

(52) U.S. Cl.
CPC ............ *H02K 21/24* (2013.01); *H02K 1/148* (2013.01); *H02K 1/182* (2013.01); *H02K 1/2793* (2013.01);
(Continued)

(58) Field of Classification Search
CPC ...... H02K 1/148; H02K 1/182; H02K 1/2793; H02K 15/022; H02K 15/03; H02K 21/24; H02K 2213/03; H02K 5/10
(Continued)

(56) References Cited

U.S. PATENT DOCUMENTS

| | | | |
|---|---|---|---|
| 4,636,677 A | 1/1987 | Yasuhara | |
| 5,030,864 A * | 7/1991 | Van Hout | H02K 21/24 310/67 R |

(Continued)

FOREIGN PATENT DOCUMENTS

| | | |
|---|---|---|
| JP | 11252886 A | 9/1999 |
| JP | 2010148211 A | 7/2010 |
| JP | 2013102659 A | 5/2013 |

*Primary Examiner* — Rashad H Johnson
(74) *Attorney, Agent, or Firm* — Dickinson Wright PLLC; Andrew D. Dorisio

(57) ABSTRACT

An apparatus is provided for forming an axial flux permanent magnet synchronous motor. The apparatus includes a stator assembly including a plurality of stator poles spaced about a stator shaft, each comprising a winding. Adjacent pairs of stator poles have a spacing in a circumferential direction approximately equal to or greater than a width of the stator pole. A rotor assembly includes a plurality of rotor poles of alternating magnetic polarity arranged for electrically communicating with the windings of the stator assembly. The ratio of stator poles to rotor poles may be less than 4:6 or, more specifically, less than or equal to about 1:2.

13 Claims, 6 Drawing Sheets

(51) Int. Cl.
  *H02K 1/14* (2006.01)
  *H02K 5/10* (2006.01)
  *H02K 1/18* (2006.01)
  *H02K 15/02* (2006.01)
  *H02K 15/03* (2006.01)

(52) U.S. Cl.
  CPC .............. *H02K 5/10* (2013.01); *H02K 15/022* (2013.01); *H02K 15/03* (2013.01); *H02K 2213/03* (2013.01)

(58) Field of Classification Search
  USPC ............ 310/154.05, 156.01, 156.32, 156.33, 310/156.34, 156.53, 156.56, 156.62, 310/156.64
  See application file for complete search history.

(56) References Cited

U.S. PATENT DOCUMENTS

| | | | |
|---|---|---|---|
| 6,005,320 A * | 12/1999 | Kim | H02K 21/24 310/114 |
| 6,020,804 A * | 2/2000 | Gandel | H02K 21/24 310/156.32 |
| 6,765,319 B1 * | 7/2004 | Thompson | H01F 1/0578 310/156.08 |
| 8,770,949 B2 | 7/2014 | Noble | |
| 2002/0104909 A1 | 8/2002 | Strutz | |
| 2004/0178757 A1 * | 9/2004 | Petersen | H02P 6/22 318/400.11 |
| 2006/0273684 A1 * | 12/2006 | Ishikawa | H02K 1/278 310/216.004 |
| 2009/0295251 A1 * | 12/2009 | Vollmer | H02K 21/16 310/195 |
| 2013/0134818 A1 * | 5/2013 | Jan | H02K 29/03 310/156.32 |
| 2013/0181547 A1 * | 7/2013 | Nishifukumoto | H02K 35/04 310/12.18 |
| 2014/0009022 A1 * | 1/2014 | Kim | H02K 1/14 310/114 |
| 2014/0021809 A1 * | 1/2014 | Burress | H02K 1/143 310/46 |
| 2014/0210319 A1 * | 7/2014 | Chen | H02K 11/215 310/68 B |
| 2017/0250580 A1 * | 8/2017 | Rhyu | H02K 1/02 |
| 2017/0366050 A1 * | 12/2017 | Hattori | H02K 1/02 |

* cited by examiner

LOW PROFILE AXIAL, FLUX PERMANENT MAGNET SYNCHRONOUS MOTOR

This application claims the benefit of U.S. Provisional Patent Application Ser. No. 62/205,987, the disclosure of which is incorporated herein by this reference.

TECHNICAL FIELD

This disclosure relates generally to the field of electric motors and, more particularly, to a low profile axial flux permanent magnet synchronous motor (AF-PMSM).

BACKGROUND

Permanent magnet synchronous motors, or PMSMs, are a known category of dynamoelectric machines. PMSMs with salient pole concentrated windings are arranged to have various combinations of rotor and stator pole numbers chosen to optimise cogging torque and power density for a given application. PMSMs with a ratio of 12 stator poles and 16 rotor poles (3:4) are known to offer a favorable combination of machine efficiency and low cogging torque and, hence, this is a typical approach.

It is known that torque generation in an electrical machine is related to machine geometry by the basic sizing equation:

Torque=Diameter$^2$×Length

Thus, it is advantageous to maximise the diameter of the machine for optimal output torque. The per-unit cost of ferrite magnet material used in the rotor poles is much lower than the cost of copper windings or stator iron components, which make up the flux path. Thus, it would be desirable to minimise the volume of copper and iron, while ferrite magnet material can be used with low cost penalty.

A machine in which electrical motors may have applicability is a ceiling fan. In the case of a fan with a blade diameter in the range 36-84 inches, negligible airflow is generated within a circle of about 12 inch diameter around the rotational centre of the blade assembly. Thus, the motor may occupy this entire volume without compromising the airflow performance of the fan.

Such a ceiling fan typically employs an AC induction motor (ACIM) with outer rotor construction and a rotor diameter of up to 8 inches. Such a fan may operate at maximum rpm in the range 150-250 rpm, and in this speed range ACIMs have very low efficiency due to the high percentage of slip between the stator rotating magnetic field and the rotor. While PMSMs offer improved efficiency compared to ACIMs by using ferrite or neodymium magnets as the rotor poles, eliminating power consumption in the rotor assembly, known arrangements often use stamped stator laminations, which require expensive tooling to produce in large diameters. Thus, existing arrangements typically have a length to diameter ratio of greater than one, and fail to take advantage of the available space in the center of a ceiling fan housing.

Accordingly, the presence disclosure proposes an axial flux permanent magnet synchronous motor that may overcome some or all of these limitations

SUMMARY

According to one aspect of the disclosure, an apparatus for forming an axial flux permanent magnet synchronous motor is provided. The apparatus comprises a stator assembly including a plurality of stator poles spaced about a stator shaft. The stator poles have a spacing approximately equal to or greater than a width of a single stator pole in the circumferential direction.

The apparatus may further include a rotor assembly comprising a plurality of rotor poles of alternating magnetic polarity arranged for electrically communicating with a winding associated with each stator pole of the stator assembly. A ratio of stator poles to rotor poles may be less than or equal to about 1:2, such as for example 3:8 (e.g., six stator poles and sixteen rotor poles, as one possible example). At least one of the rotor poles has a width in a circumferential direction, and the stator pole and winding together have a diameter greater than the width (e.g., the pole and winding may together have a single diameter of about 60 millimeters, in one example). The winding may be arranged such that it always spans across at least two rotor poles (regardless of the operating state of the motor).

The apparatus may further include a bobbin for receiving each winding and adapted for receiving one stator pole. The bobbin may have a diameter greater than a width of each of the plurality of rotor poles. A ratio of a height of the bobbin to the diameter of the bobbin is less than 2:5, and may be 1:6. The bobbin may have a diameter that is greater than a diameter of the stator pole, such as by twice as much.

According to an aspect of the disclosure, an axial flux permanent magnet synchronous motor includes a stator assembly including M stator poles spaced about a stator shaft, each comprising a winding. A rotor assembly comprising N rotor poles of alternating magnetic polarity arranged for electrically communicating with the windings of the stator assembly to cause rotation of the rotor assembly relative to the stator assembly. The value of M/N is less than 0.66, and may be 0.5 or less (such as, for example, 0.375).

In one embodiment, at least one of the rotor poles has a width in a circumferential direction. The stator pole and winding together have a diameter greater than the width. Thus, the winding may always span across at least two rotor poles.

A bobbin may also be provided for receiving the winding and adapted for receiving one stator pole. Each bobbin has a diameter greater than a width of each of the plurality of rotor poles. A ratio of a height of the bobbin to the diameter of the bobbin is less than 2:5, and may be 1:6.

Still a further aspect of the disclosure pertains to an axial flux permanent magnet synchronous motor having a stator assembly including a plurality of stator poles spaced about a stator shaft, each comprising a winding. A rotor assembly comprises a plurality of rotor poles of alternating magnetic polarity arranged for electrically communicating with the windings of the stator assembly to cause rotation of the rotor assembly relative to the stator assembly. At least one of the rotor poles has a width in a circumferential direction, and the stator pole and winding have a combined diameter greater than the width.

In one embodiment, the ratio of stator poles to rotor poles is less than or equal to about 1:2. In another embodiment, the ration of stator poles to rotor poles is less than or equal to 3:8.

A bobbin may be provided for receiving the winding and adapted for receiving one stator pole. Each bobbin may have a width greater than a width of each of the plurality of rotor poles. A ratio of a height of the bobbin to the width of the bobbin is less than 2:5, such as 1:6.

Yet a further aspect of the disclosure relates to an apparatus for an axial flux permanent magnet synchronous motor. The apparatus comprises a bobbin including a winding. The bobbin has a ratio of a height of the bobbin to a diameter of the bobbin of less than 2:5, such as 1:6. For example, the bobbin diameter may be approximately 60 millimeters and the bobbin height is approximately 6 millimeters.

Any of the motors or apparatuses described herein may be used in connection with a ceiling fan.

BRIEF DESCRIPTION OF DRAWINGS

The accompanying drawing figures incorporated herein and forming a part of the specification, illustrate several aspects of the disclosed motor and apparatuses for use in connection therewith, serve to explain certain principles thereof. In the drawing figures.

Reference will now be made in detail to the present preferred embodiments of an axial flux-permanent magnet synchronous motor, examples of which are illustrated in the accompanying drawing figures.

DETAILED DESCRIPTION

Figure 1:
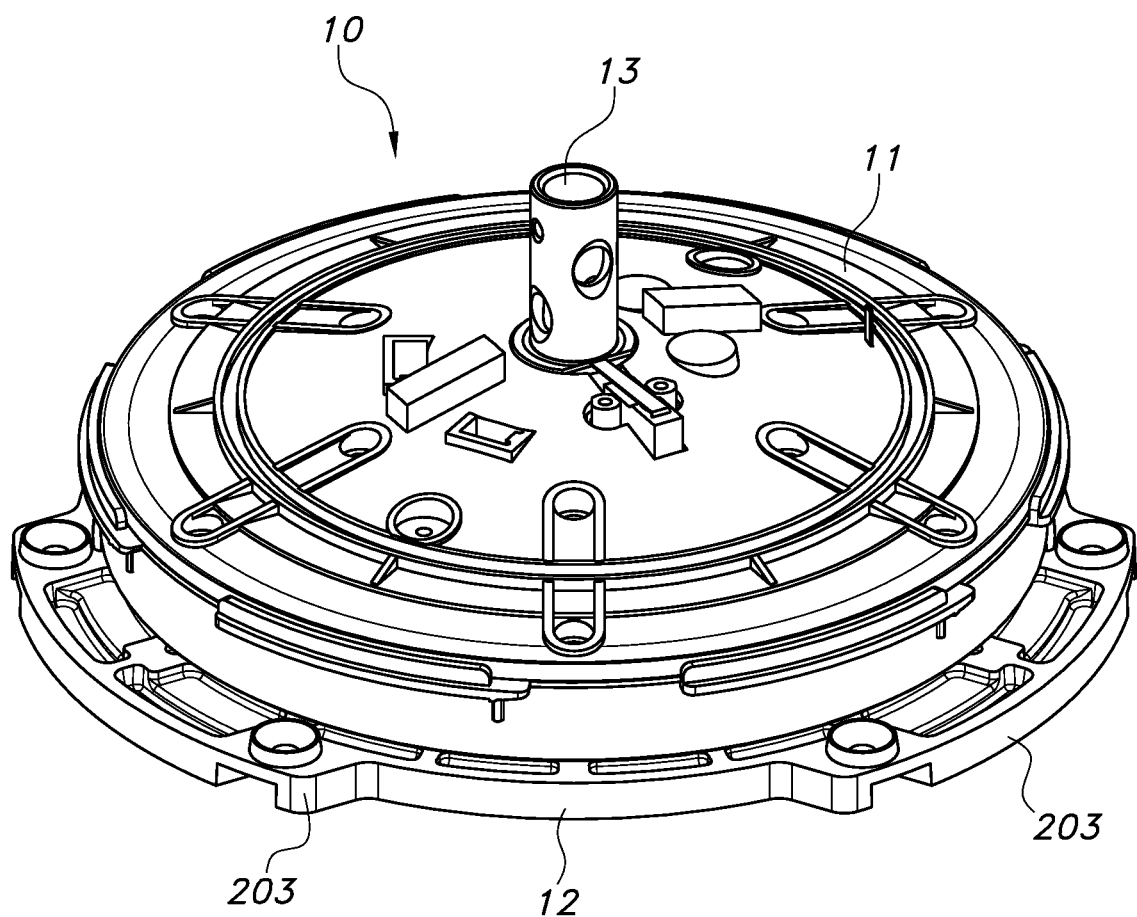
FIG. 1 is an exterior view of an axial flux-permanent magnet synchronous motor.

Referring now to FIG. 1, one example of an axial flux-permanent magnet synchronous motor 10 includes a stator assembly 11 with centrally located stationary stator shaft 13, and rotor assembly 12 adapted for rotating relative to the stator assembly 11. In the case of possible use in a ceiling fan, multiple blade mounts 203 may be provided, and may be integrally cast as part of the rotor assembly 12. An example of such an arrangement may be found in U.S. Pat. No. 8,770,949, the disclosure of which is incorporated herein by reference.

Figure 2:
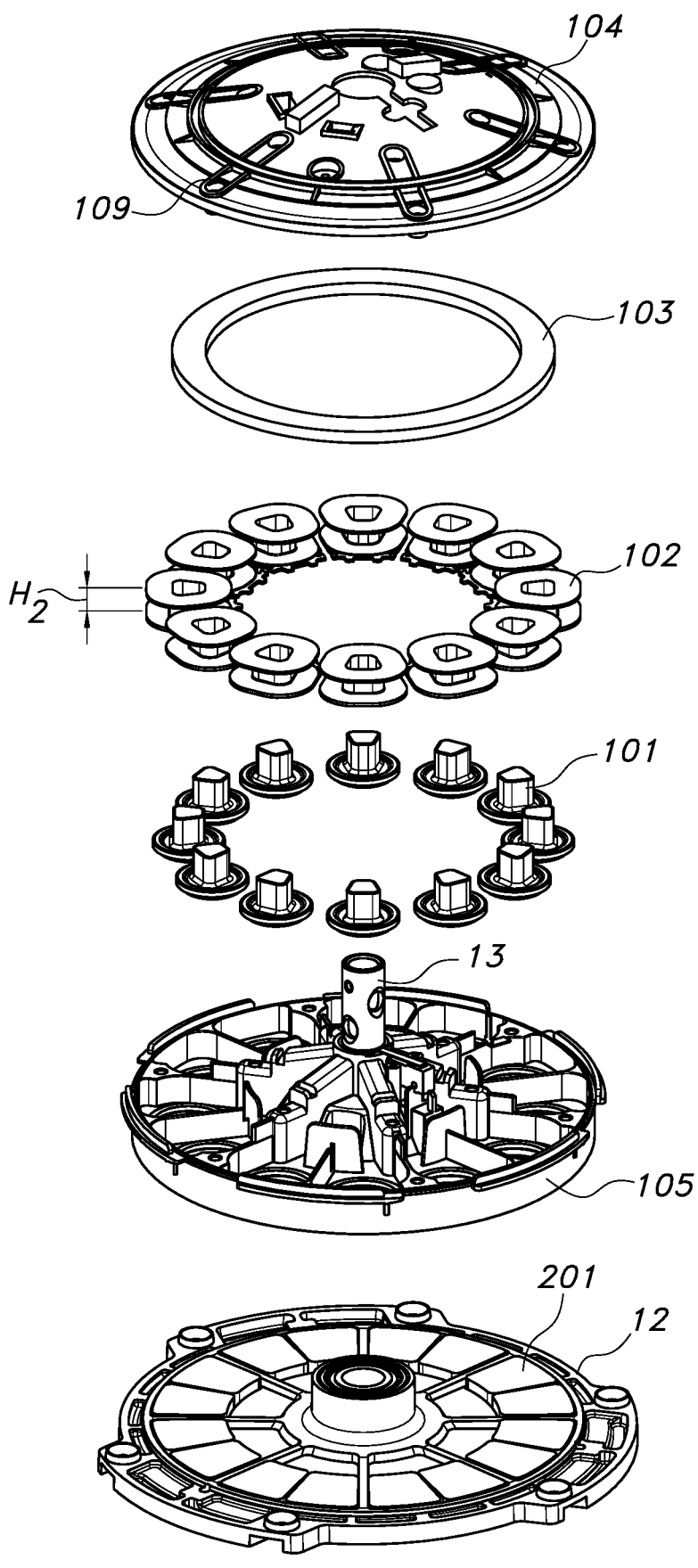
FIG. 2 is an exploded view of a 12:16 stator to pole axial flux-permanent magnet synchronous motor.
Figure 3:
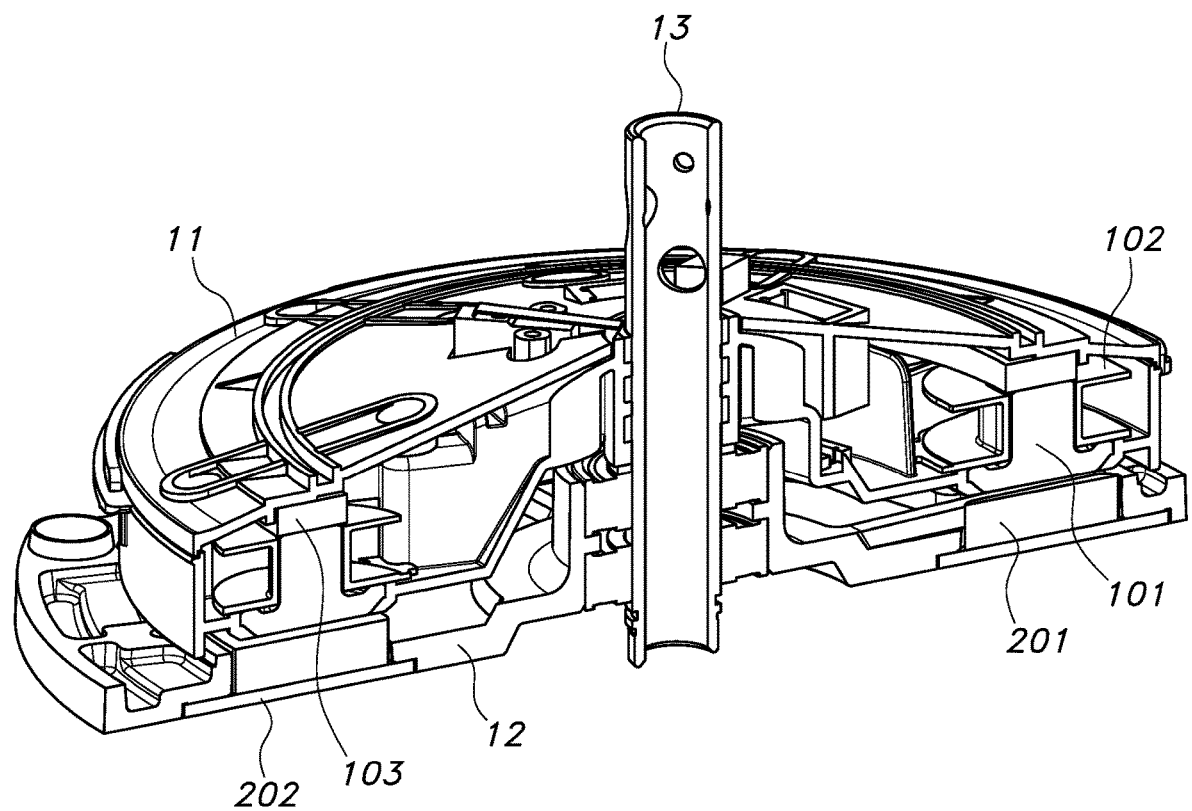
FIG. 3 is a cross-sectional view of the axial flux-permanent magnet synchronous motor of FIG. 2.

FIGS. 2 and 3 illustrate one example of an axial flux-permanent magnet synchronous motor with twelve (12) stator poles 101 and sixteen (16) rotor poles 201, which may comprise alternating polarity magnets (thus creating a fixed magnetic field, whereas the magnetic field of the stator assembly 11 is variable). Concentrated windings (such as formed by copper or aluminium magnet wire) are associated with the poles 101 (such as on an upstanding portion thereof supported by a base) and may be wound on bobbins 102, which fit over the stator poles 101 in a concentric configuration. A back iron ring 103 is fitted on top of the stator poles 101 and completes the stator magnetic surface. The back iron ring 103 may be clamped in position on top of the stator poles 101 by clamp features 109 integral to the stator top cover 104, and suitable fasteners (such as self-tapping screws) may be used to hold the assembly together. A similar ring 202 is provided for rotor assembly 201.

Figure 4:
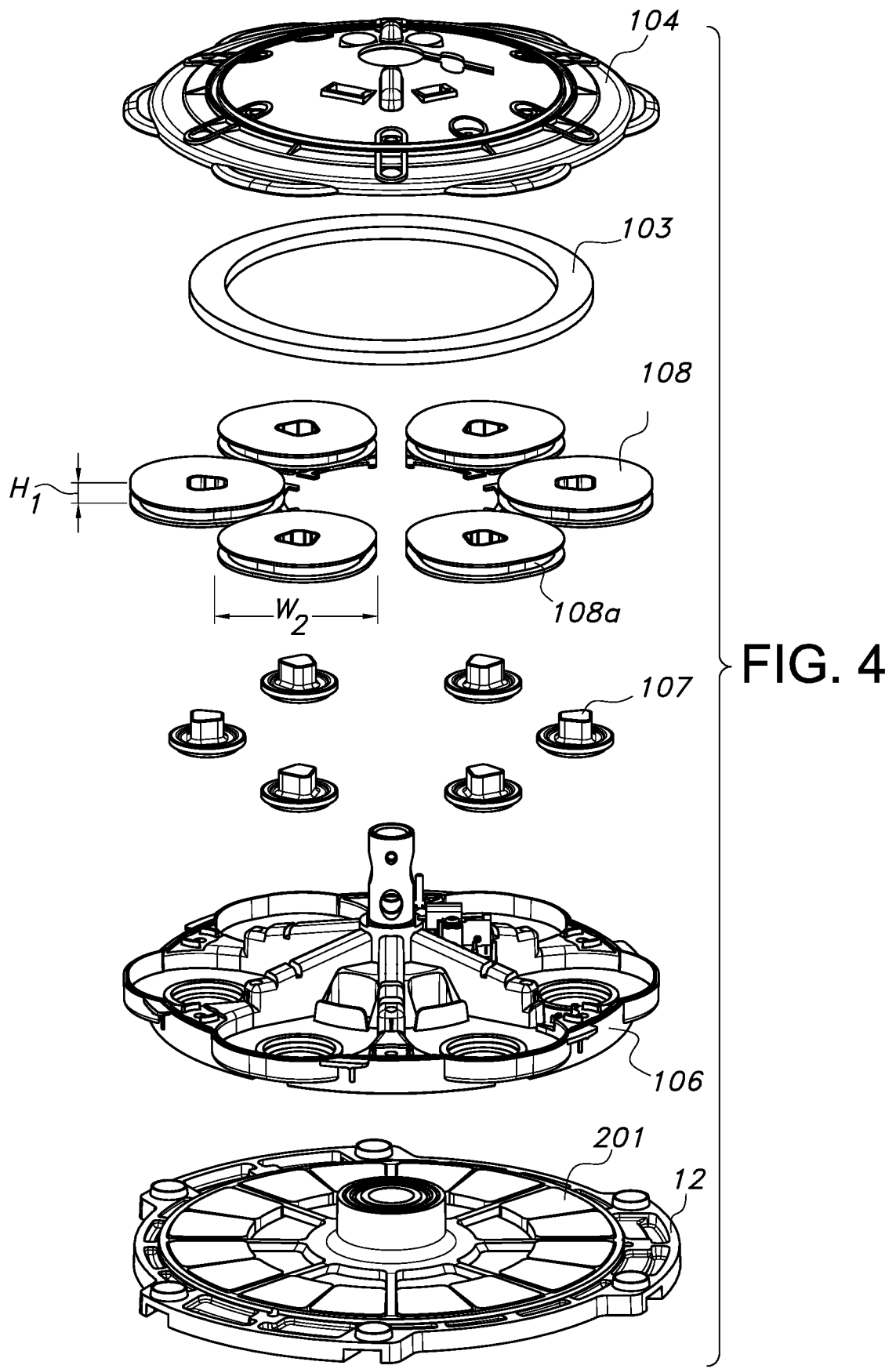
FIG. 4 is an exploded view of a 6:16 stator to pole axial flux-permanent magnet synchronous motor according to the present disclosure.
Figure 5:
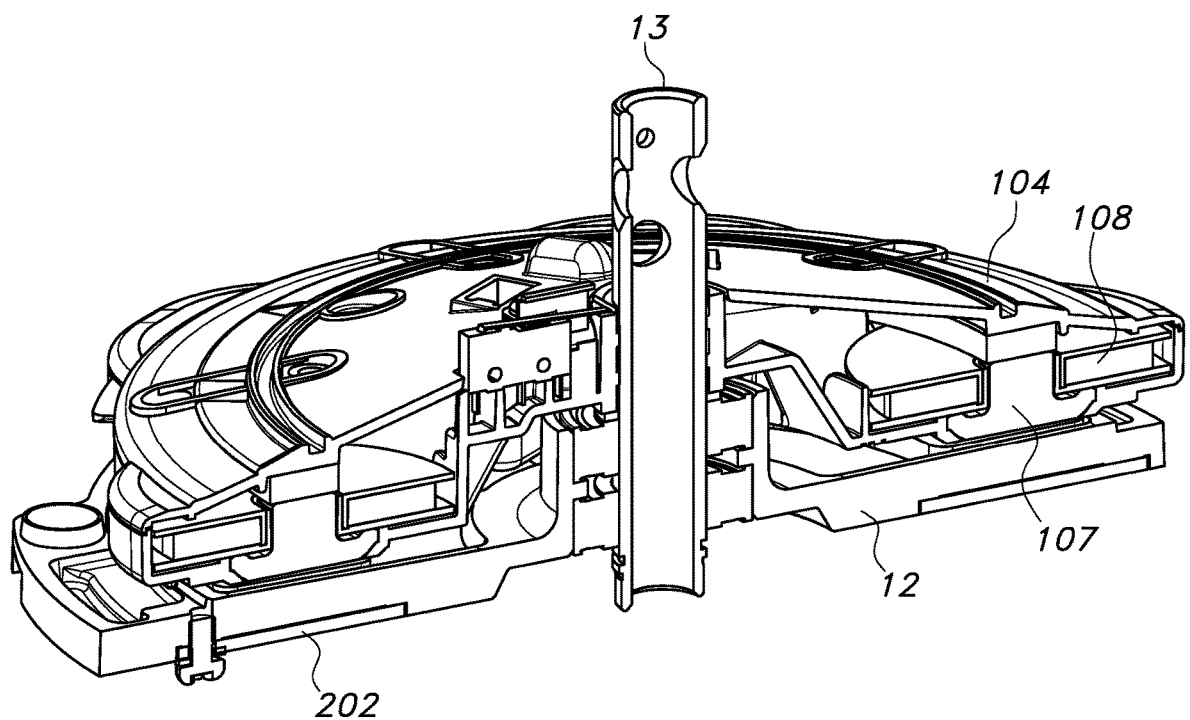
FIG. 5 is a cross-sectional view of the axial flux-permanent magnet synchronous motor of FIG. 4.
Figure 6:
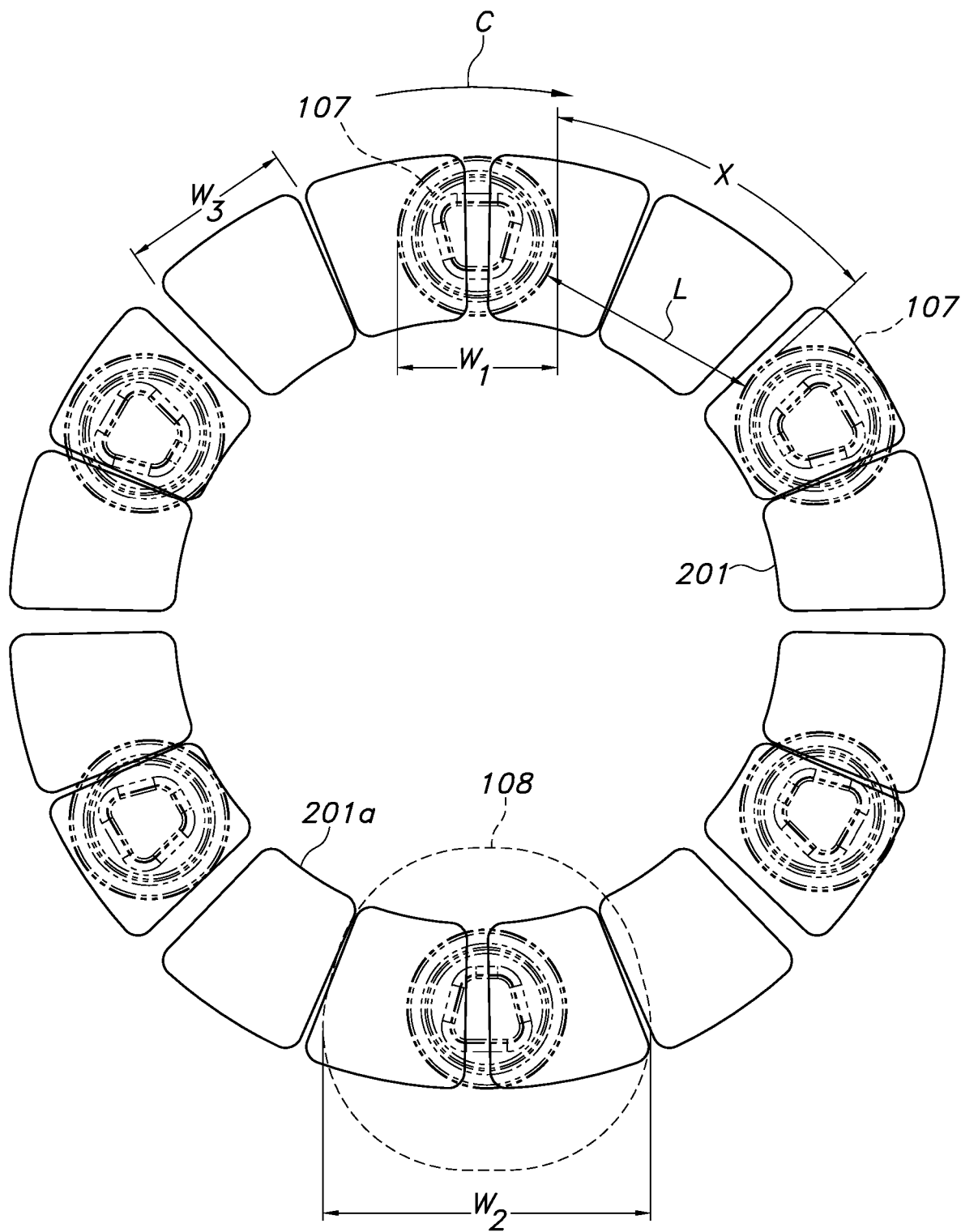
FIG. 6 is a schematic, partially cutaway view of the rotor assembly with parts of the stator assembly shown in phantom line view.

According to one aspect of the disclosure, and with reference to FIGS. 4 and 5, the number of stator poles 107 and bobbins 108 are reduced, for example, while the rotor assembly 12 and rotor poles 201 remain the same as in the PMSM of FIG. 2. For instance, the ratio of the number of stator poles 107 to rotor poles 201 may be less than 4:6, or less than or equal to 1:2, so that there is at least one stator pole for every two rotor poles. Consequently, as indicated in FIG. 6, the distance or space X in a circumferential direction C between adjacent edges of the stator poles 107 may be greater than a width $W_1$ of each stator pole (as is the linear distance L, the shortest line between the edges of two adjacent poles), which is possible in view of the elimination of the intervening stator poles in the conventional configuration.

As can be appreciated, fewer stator poles 107 in a given space also allows for the windings to be larger, such that each winding 108a and the associated bobbin 108 has a diameter $W_2$ that is greater than a maximum width $W_3$ of each rotor pole 201 in the circumferential direction C. As can thus be appreciated, each winding 108a (and the associated bobbin 108) always spans across at least two adjacent rotor poles 201 (either when rotor assembly 12 is rotating or in a stationary configuration), and could span over more than two, such as three, four, five, or more, depending on the configuration. In the FIG. 6 arrangement, at least one rotor pole 201 (such as pole 201a), and possibly more (four, as shown) may not be associated with or adjacent to any stator pole 107 when the rotor assembly 12 is at rest.

As can be further appreciated by comparing FIGS. 3 and 5, the stator poles 107 may be shorter, and the bobbins 108 (or the windings 108, in particular) made shorter (about half of the height—6 millimeters ($H_1$) versus 12 millimeters ($H_2$) and of larger diameter $W_2$ (greater than the diameter (width) $W_1$ of the stator pole 107; in one example, $W_2$ may be about 60 millimeters, whereas $W_1$ is about 30 millimeters, or about half as much), now occupying the space previously filled by the intermediate poles. Thus, the bobbin 108 may have a ratio of a height to diameter of less than 2:5, such as 1:6. As can be appreciated, this expansion of the bobbins 108 in the radial direction and reduction in the vertical direction allows for the height of the motor 10 to be reduced compared to the typical PMSM.

Comparing with the example of FIGS. 2 and 3, removing the six intermediate stator poles, as indicated in FIG. 4, results in the generation of 50% of the torque compared to the 12:16 pole typical PMSM, but with 50% of the active stator material. By comparison, if the typical PMSM were reduced in diameter so that only six (6) stator poles were used in a six stator pole to eight rotor pole ratio (0.75), then nominal airgap diameter would reduce by 50% and, according to the "$D^2L$" motor sizing equation, the output torque would reduce to 25%. Thus, the proposed embodiment with a ratio of stator poles 107 to rotor poles 201 of 0.5 (and in any case less than 0.66) provides a significant gain in utilization of active stator materials compared to a typical PMSM.

Also, the larger area available between stator poles allows for low-profile bobbins/windings 108, 108a to be used. This may be used to reduce the overall height of the motor 10, which may have advantages in form-factor and industrial design of products where the motor is employed, especially in a ceiling fan.

The stator poles 107 may comprise soft-magnetic composite materials, and may take any shape or form (such as circular, rectangular, or trapezoidal, as a few examples). The poles 107 may be insert-molded simultaneously with the shaft 13 to ensure that all faces are planar that that the shaft is accurately positioned (and perpendicular to) the planes of the poles 107. The back iron ring 103 may be formed by tightly winding a thin ribbon of laminated steel in concentric layers, which is clamped between the rear surface of the pole pieces and the stator top cover, thus forming a complete magnetic circuit. The back iron ring 103 may also be formed by a stack of thin laminated steel rings.

The foregoing discussion is intended to provide an illustration of the inventive concepts, and is not intended to limit the invention to any particular mode or form. Any elements described herein as singular can be pluralized (i.e., anything described as "one" can be more than one), and plural elements can be used individually. Characteristics disclosed of a single variation of an element, the device, the methods, or combinations thereof can be used or apply for other variations, for example, dimensions, shapes, materials, or combinations thereof. Any species element of a genus element can have the characteristics or elements of any other species element of that genus. Terms like "approximately," "about" "generally" or "substantially" mean that the value may vary depending on the circumstances, such as up to 10% of a given condition. The term "diameter" is not intended to limit an element to any particular shape. The above-described configurations, elements or complete assemblies and methods and their elements for carrying out the invention, and variations of aspects of the invention can be combined and modified with each other in any combination, along with any obvious modifications.

The invention claimed is:

1. An apparatus for forming an axial flux permanent magnet synchronous motor, comprising:
    a stator assembly including a plurality of stator poles spaced about a stationary stator shaft, the stator poles having a spacing approximately equal to or greater than a width of a single stator pole in the circumferential direction; and
    a rotor assembly adapted to rotate relatively to the stator assembly, the rotor assembly comprising a plurality of rotor poles of alternating magnetic polarity arranged for electrically communicating with a winding associated with each stator pole of the stator assembly;
    wherein a ratio of stator poles to rotor poles is less than 1:2.

2. The apparatus of claim 1, wherein the ratio of stator poles to rotor poles is 3:8.

3. The apparatus of claim 1, wherein at least one of the rotor poles has a width in a circumferential direction, and the stator pole and winding together have a diameter greater than the width.

4. The apparatus of claim 1, wherein the winding always spans across at least two rotor poles.

5. The apparatus of claim 1, wherein each rotor pole comprises alternating polarity magnets.

6. An axial flux permanent magnet synchronous motor, comprising:
    a stator assembly including M stator poles spaced about a stator shaft, each comprising a winding; and
    a rotor assembly comprising N rotor poles of alternating magnetic polarity arranged for electrically communicating with the windings of the stator assembly to cause rotation of the rotor assembly relative to the stator assembly;
    wherein M/N is less than 0.5; and
    wherein at least one of the rotor poles has a width in a circumferential direction, and the stator pole and winding together have a diameter greater than the width.

7. The motor of claim 6, wherein the winding always spans across at least two rotor poles.

8. The motor of claim 6, with six stator poles and sixteen rotor poles.

9. The motor of claim 6, wherein M/N is 0.375.

10. An axial flux permanent magnet synchronous motor, comprising:
    a stator assembly including a plurality of stator poles spaced about a stator shaft, each comprising a winding; and
    a rotor assembly comprising a plurality of rotor poles of alternating magnetic polarity arranged for electrically communicating with the windings of the stator assembly to cause rotation of the rotor assembly relative to the stator assembly;
    wherein at least one of the rotor poles has a width in a circumferential direction, and the stator pole and winding have a combined diameter greater than the width.

11. The motor of claim 10, wherein a ratio of stator poles to rotor poles is less than or equal to about 1:2.

12. The motor of claim 11, wherein the ratio is 3:8.

13. The motor of claim 10, with six stator poles and sixteen rotor poles.

* * * * *